United States Patent [19]
Fitzgerald et al.

[11] Patent Number: 5,480,724
[45] Date of Patent: Jan. 2, 1996

[54] FUSER ROLL FOR FIXING TONER TO A SUBSTRATE COMPRISING TIN OXIDE FILLERS

[75] Inventors: John J. Fitzgerald, Webster; Wayne T. Ferrar, Fairport, both of N.Y.

[73] Assignee: Eastman Kodak Company, Rochester, N.Y.

[21] Appl. No.: 167,584

[22] Filed: Dec. 14, 1993

Related U.S. Application Data

[63] Continuation-in-part of Ser. No. 984,059, Nov. 30, 1992, abandoned.

[51] Int. Cl.$^6$ ............................................. B32B 9/00
[52] U.S. Cl. ........................... 428/447; 428/422; 428/463; 428/448; 428/451; 355/285; 355/282
[58] Field of Search ............................ 428/422, 447, 428/463, 906, 448, 451; 430/99; 355/285, 282

[56] References Cited

U.S. PATENT DOCUMENTS

| | | | |
|---|---|---|---|
| 4,264,181 | 4/1981 | Lentz et al. | 355/3 |
| 4,272,179 | 6/1981 | Seanor | 355/3 |
| 4,320,714 | 3/1982 | Shimazaki | 118/60 |
| 4,373,239 | 2/1983 | Henry et al. | 629/132 |
| 4,375,505 | 3/1983 | Newkirk | 438/99 |
| 4,430,406 | 2/1984 | Newkirk et al. | 430/99 |
| 4,501,482 | 2/1985 | Stryjewski | 355/3 |
| 4,515,884 | 5/1985 | Field et al. | 430/99 |
| 4,518,655 | 5/1985 | Henry et al. | 428/329 |
| 4,853,737 | 8/1989 | Hartley et al. | 755/209 |
| 4,935,785 | 6/1990 | Wildi et al. | 355/290 |
| 5,017,432 | 5/1991 | Eddy et al. | 428/422 |
| 5,102,741 | 4/1992 | Miyabayashi | 118/60 |

OTHER PUBLICATIONS

Fitzgerald et al, *Polymer Engineering and Science*, vol. 32, No. 18 Sep., 1992, pp. 1350–1357.

Concise Chemical & Technical Dictionary, 4th Ed., Bennet, Chem. Publ. 1994.

*Primary Examiner*—Patrick J. Ryan
*Assistant Examiner*—Patrick R. Jewik
*Attorney, Agent, or Firm*—Anne B. Kiernan; Robert Luke Walker

[57] ABSTRACT

The invention provides a fuser roll useful for heat-fixing an electrographic toner to a substrate, wherein the roll comprises a core having thereon a base cushion layer comprising a condensation-crosslinked poly(dimethylsiloxane) elastomer, characterized in that the base cushion layer has tin oxide particles dispersed therein in a concentration of from 20 to 40 percent of the total volume of the base cushion layer.

The base cushion layer of such a fuser roll has been unexpectedly found to exhibit only minimal weight loss, creep, and changes in hardness, over time, when subjected to conditions of elevated temperature and cyclic stress.

19 Claims, No Drawings

5,480,724

FUSER ROLL FOR FIXING TONER TO A SUBSTRATE COMPRISING TIN OXIDE FILLERS

This is a Continuation-In-Part of application Ser. No. 984,059, filed Nov. 30, 1992 now abandoned.

FIELD OF THE INVENTION

This invention relates to a fuser roll useful for heat-fixing a heat-softenable toner material to a substrate. More particularly, the invention relates to a fuser roll having improved stability under conditions of elevated temperature and cyclic stress.

BACKGROUND

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, e.g., a receiver sheet comprising paper or a transparent film, where it is then fixed in place to yield the final desired toner image.

When heat-softenable toners, comprising, e.g., thermoplastic polymeric binders, are employed, the usual method of fixing the toner in place involves applying heat to the toner once it is on the receiver sheet surface to soften it and then allowing or causing the toner to cool.

One such well-known fusing method comprises passing the toner-bearing receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll.

The fuser roll usually comprises a rigid core covered with a resilient material, which will be referred to herein as a "base cushion layer." The resilient base cushion layer and the amount of pressure exerted by the pressure roll serve to establish the area of contact of the fuser roll with the toner-bearing surface of the receiver sheet as it passes through the nip of the pair of rolls. The size of this area of contact helps to establish the length of time that any given portion of the toner image will be in contact with and heated by the fuser roll. The degree of hardness (often referred to as "storage modulus") and stability thereof, of the base cushion layer are important factors in establishing and maintaining the desired area of contact.

Also, often the pressure roll and fuser roll have a regular cylindrical shape, but it has been found in the prior art to be advantageous in some cases to change the shape of the pressure roll in order to vary the amount of pressure exerted by the pressure roll against the receiver sheet and fuser roll. This variance of pressure, in the form of a gradient of pressure that changes along the direction through the nip that is parallel to the axes of the rolls, can be established, for example, by continuously varying the overall diameter of the pressure roll along the direction of its axis such that the diameter is smallest at the midpoint of the axis and largest at the ends of the axis, in order to give the pressure roll a sort of "bow tie" or "hourglass" shape. This will cause the pair of rolls to exert more pressure on the receiver sheet in the nip in the areas near the ends of the rolls than in the area about the midpoint of the rolls. This gradient of pressure helps to prevent wrinkles and cockle in the receiver sheet as it passes through the nip.

However, if, over time of use, the fuser roll begins to permanently deform to conform to the shape of the pressure roll, the gradient of pressure will be reduced or lost, along with its attendant benefits. It has been found that permanent deformation (alternatively referred to as "creep") of the base cushion layer of the fuser roll is the greatest contributor to this problem.

One type of material that has been widely employed in the past to form a resilient base cushion layer for fuser rolls is condensation-crosslinked poly(dimethylsiloxane) elastomer. "Poly(dimethylsiloxane)" will sometimes be alternatively referred to herein as "PDMS". The prior art has also taught or suggested that various fillers comprising inorganic particulate materials can be included in such PDMS base cushion layers to improve their mechanical strength and/or thermal conductivity. Higher thermal conductivity is advantageous when the fuser roll is heated by an internal heater, so that the heat can be efficiently and quickly transmitted toward the outer surface of the fuser roll and toward the toner on the receiver sheet it is intended to contact and fuse. Higher thermal conductivity is not so important when the roll is intended to be heated by an external heat source. Disclosure of such filled condensation-cured PDMS elastomers for fuser rolls can be found, for example, in U.S. Pat. Nos. 4,373,239; 4,430,406; and 4,518,655.

Optimal metal-filled elastomer fuser members have long been sought. At one time, it was predicted that:

"The metal of the metal-containing filler dispersed in the elastomer may be easily selected by one skilled in the art without undue experimentation by testing the metal-containing filler, such as a metal, metal alloy, metal oxide, metal salt or other metal compound, in an elastomer. The general classes of metals which are applicable to the present invention include those metals of Groups 1b, 2a, 2b, 3a, 3b, 4a, 4b, 5a, 5b, 6b, 7b, 8 and the rare earth elements of the Periodic Table." (U.S. Pat. No. 4,264,181 to Lentz et al, column 10, lines 42–53; also U.S. Pat. No. 4,272,179 to Seanor, column 10, lines 45–54.)

This prediction of easy selection of the metal for a metal-containing filler has proven false in the face of latter efforts in the art.

A metal-containing filler which provides good results in one elastomer may provide very poor results in another elastomer, even if the elastomers are very similar. In U.S. Pat. No. 4,264,181 to Lentz et al, good results are obtained when lead oxide is used as a filler in various fluoroelastomers (Viton E430, Viton E60C, Viton GH; Examples X, XI, XII). In U.S. Pat. No. 5,017,432 to Eddy et al, on the other hand, the use of lead oxide in similar fluoroelastomers (for example, Viton GF) is taught against on the basis that it would produce an unacceptable fuser member. In these fluoroelastomers, cupric oxide is preferred. Similarly, U.S. Pat. No. 4,515,884 to Field et al, discloses a fuser member which utilizes metal oxide filled polydimethylsiloxane. The metal oxides are iron oxide and tabular alumina. Calcined alumina is described as being unsuitable per se (column 9, line 50—column 10 line 47).

An additional difficulty that has faced those attempting to produce metal-filled elastomer fuser members has recently been identified. In the past, it was thought that various materials' suitability for use in fuser roll base cushion layers in terms of their stability during use—i.e., their ability to resist degradation (as evidenced by weight loss), creep, and changes in hardness, during use in fuser rolls-could be determined by subjecting samples of the materials to conditions of continuous high temperature and continuous high stress (i.e., pressure), and then measuring the resultant changes in weight, shape (e.g., length), and hardness (e.g., storage modulus). However, J. J. Fitzgerald et al, "The Effect of Cyclic Stress on the Physical Properties of a Poly(Dimethylsiloxane) Elastomer", *Polymer Engineering and Science*, Vol. 32, No. 18, (Sept. 1992), pp. 1350–1357, indicates that such testing does not accurately portray the stability the materials will exhibit during actual use in fuser roll base cushion layers and that dynamic testing, with cycles of loading and unloading is necessary. The publication cites other reports showing the same kind of results in studies of other elastomers. Accordingly, the present inventors have helped to develop a device called a Mechanical Energy Resolver (sometimes alternatively referred to herein as an "MER"), which can be used to test samples of materials of interest for use in fuser roll base cushion layers. The device applies heat continuously to maintain the samples at a constant elevated temperature. The device also applies stress to the samples in the form of a compressive force, but does so in a manner such that the amount of compressive force applied varies cyclically (i.e., sinusoidally). The results of such testing consistently correlate with, and therefore reliably predict, the degree of stability a material will exhibit in the base cushion layer of a fuser roll during actual use.

The realization of the need for dynamic testing promises more accurate evaluation of filled elastomers, however, preparation of metal containing elastomers remains problematic. U.S. Pat. Nos. 4,515,884 to Field et al, and 5,017,432 to Eddy et al, cite large numbers of critical features or important aspects of their metal containing elastomers: choice of material (Field, column 9, lines 50–65 and column 10, lines 24–25), interaction of filler surface and elastomer (Field, column 9, lines 32–65), particle size (Field, column 10, lines 1–8 and lines 25–30; Eddy, column 9, line 65—column 10, line 3), concentration of metal-filler (Field, column 10, lines 9–23 and lines 31–47), capability of interacting with functional groups of release agent (Eddy, column 9, lines 26–30), reactivity of the metal filler with the elastomer (Eddy, column 9, lines 33–43), and acid-base characteristics of the metal filler (Eddy, column 9, lines 43–56). The lists of critical features and important aspects in Field and Eddy do not fully correlate. It is unknown whether this difference represents real differences in material characteristics or only differences in techniques and analysis.

One specific example of a condensation-crosslinked PDMS elastomer, which contains about 32–37 volume percent aluminum oxide filler and about 2–6 volume percent iron oxide filler, and which has been widely used and taught to be useful in fuser rolls, is sold under the trade name, EC4952, by the Emerson Cummings Co., U.S.A. However, it has been found that fuser rolls containing EC4952 cushion layers exhibit serious stability problems over time of use, i.e., significant degradation, creep, and changes in hardness, that greatly reduce their useful life. The present inventors have also found that MER test results correlate with and thus accurately predict the instability exhibited during actual use. Nevertheless, materials such as EC4952 initially provide very suitable resilience, hardness, and thermal conductivity for fuser roll cushion layers.

It would therefore be very desirable to be able to provide a fuser roll with a base cushion layer comprising a condensation-crosslinked PDMS elastomer containing appropriate fillers, wherein the cushion layer material will exhibit, under conditions of elevated temperature and cyclic stress, good stability, i.e., good resistance to degradative weight loss, creep, and changes in hardness. The present invention meets this need.

SUMMARY OF THE INVENTION

The invention provides a fuser roll useful for heat-fixing an electrographic toner to a substrate, wherein the roll comprises a core having thereon a base cushion layer comprising a condensation-crosslinked poly(dimethylsiloxane) elastomer, characterized in that the base cushion layer has tin oxide particles dispersed therein in a concentration of from 20 to 40 percent of the total volume of the base cushion layer.

The base cushion layer of such a fuser roll has been unexpectedly found to exhibit only minimal weight loss, creep, and changes in hardness, over time, when subjected to conditions of elevated temperature and cyclic stress.

DESCRIPTION OF PREFERRED EMBODIMENTS

The condensation-crosslinked PDMS elastomer in the base cushion layer of fuser rolls provided by the invention can be formed by condensation reaction of silanol-terminated PDMS polymers with multifunctional silanes.

Silanol-terminated PDMS polymers and methods of their preparation are well known. They are readily commercially available, e.g., from Huls America, Inc., 80 Centennial Ave., Piscataway, N.J., U.S.A., and have the structure:

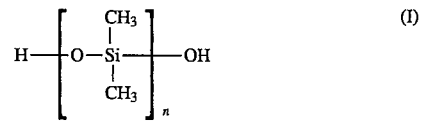

For purpose of the present invention n is an integer such that the Structure (I) polymer has a weight average molecular weight of from 7,000 to 70,000. If the molecular weight were below 7,000, the final crosslinked PDMS would have a high crosslink density that would make the material too hard and brittle, and not resilient enough to serve practically in a base cushion layer. If the molecular weight were above 70,000, the final crosslinked PDMS would be too unstable under conditions of high temperature and cyclic stress (i.e., there would be too much creep and change in hardness over time), even when tin oxide fillers are dispersed therein in accordance with the invention.

The multifunctional silanes that can serve as crosslinking agents for the Structure (I) polymers are well known for this purpose. Each of such silanes comprises a silicon atom bonded to at least three groups that are functional to condense with the hydroxy end groups of the Structure (I) polymers to thereby create siloxane crosslinks through the silicon atom of the silane. The functional groups of the silanes can be, for example, acyloxy (R—COO—), alkenoxy ($CH_2$=C(R) O—), alkoxy (R—O—), dialkylamino ($R_2$N—), or alkyliminoxy ($R_2$C=N—O—) groups, wherein R represents an alkyl moiety. Some specific examples of suitable multifunctional silane crosslinking agents are methyltrimethoxysilane, tetraethoxysilane, methyltripropenoxysilane, methyltriacetoxysilane, methyltris(butanone oxime)silane, and methyltris(diethylamino)silane.

In the case where alkoxy functional groups are employed, the condensation crosslinking reaction is carried out with the aid of a catalyst, such as, for example, a titanate, chloride, oxide, or carboxylic acid salt of zinc, tin, iron, or lead. Some specific examples of suitable catalysts are zinc octoate, dibutyltin diacetate, ferric chloride, and lead dioxide.

The tin oxide particles employed as filler in the base cushion layer of a fuser roll of the invention can be obtained from any convenient commercial source, e.g., Magnesium Elektron, Inc., Flemington, N.J., U.S.A. The particle size does not appear to be critical. Particle sizes anywhere in the range of 0.1 to 100 micrometers have been found to be acceptable. In the examples presented below the tin oxide particles were from 1 to 40 micrometers in diameter.

The tin oxide filler particles are mixed with the Structure (I) polymer and multifunctional silane crosslinker prior to curing the mix on the fuser roll core to form the base cushion layer. The tin oxide particles comprise from 20 to 40 percent of the total volume of the base cushion layer. Concentrations less than 20 volume percent may not provide the degree of stability desired to the layer. Concentrations greater than 40 volume percent will render the layer too hard to provide the desired area of contact with the toner-bearing receiver sheet.

In cases where it is intended that the fuser roll be heated by an internal heater, it is desirable that the base cushion layer have a relatively high thermal conductivity, so that the heat can be efficiently and quickly transmitted toward the outer surface of the fuser roll that will contact the toner intended to be fused. Tin oxide filler particles increase the thermal conductivity of a condensation-crosslinked PDMS base cushion layer. When tin oxide particles are dispersed in the base cushion layer at a concentration of from 30 to 40 percent of the total volume of the layer, the thermal conductivity of the layer is at least as high as prior art base cushion layer formulations, such as the previously mentioned EC4952.

Fuser rolls in accordance with the invention can also have one or more other layers over the base cushion layer, if desired. This allows one not to be concerned with the wear-resistance and toner-release properties of the base cushion layer. Properties such as abrasion-resistance and the ability to fuse toner without having some of the toner adhere to the fuser roll and be pulled away from the receiver sheet as it exits the nip of the rolls, can be provided by such other layer or layers over the base cushion layer, as is well known in the art.

Also, in some fusing systems a release oil, such as a PDMS oil, is continually provided and coated over the outermost surface of the fuser roll during use, in order to aid the roll in releasing from the toner it contacts during the fusing operation. If such oil contacts the condensation-crosslinked PDMS base cushion layer, it can cause the layer to swell and change its shape undesirably and can also cause other undesirable degradative effects such as loss of adhesion of the base cushion layer to the fuser roll core. Materials for the other layer or layers over the base cushion layer can be chosen to provide a barrier that prevents such release oil from coming into contact with the base cushion layer, as is also well known in the art.

For description of other layers and materials therefor that can be usefully provided over fuser roll base cushion layers, see, for example, U.S. Pat. Nos. 4,375,505; 4,430,406; 4,501,482; and 4,853,737. In some specific embodiments of the present invention, the base cushion layer has one other layer thereover, which is an oil-barrier layer comprising poly(vinylidene fluoride-co-hexafluoropropylene), a material commercially available, for example, from DuPont, U.S.A., under the trademark, Viton A. In some other specific embodiments, there are two layers over the base cushion layer, e.g., an oil-barrier layer and, thereover, an outermost layer that provides good wear-resistance and toner-release properties, comprising, for example, a vinyl-addition-crosslinked PDMS having silica and titania fillers dispersed therein, such as is commercially available from Dow-Corning, U.S.A., under the trademark, Silastic E.

Usually, the other layer or layers, when employed, are flexible but thinner than the base cushion layer, so that the base cushion layer can provide the desired resilience to the fuser roll, and the other layers can flex to conform to that resilience without having to be resilient themselves. The thickness of the base cushion layer and other layers will be chosen with consideration of the requirements of the particular application intended. For example, base cushion layer thicknesses in the range from 0.6 to 5.0 mm have been found to be appropriate for various applications. In some embodiments of the present invention, the base cushion layer is about 2.5 mm thick, and any oil-barrier and/or wear-resistant toner-release layers thereover are each about 25 to 30 micrometers thick.

The core of the fuser roll is usually cylindrical in shape. It comprises any rigid metal or plastic substance. Metals are preferred when the fuser roll is to be internally heated, because of their generally higher thermal conductivity. Suitable core materials include, e.g., aluminum, steel, various alloys, and polymeric materials such as thermoset resins, with or without fiber reinforcement.

To form the base cushion layer of a fuser roll in accordance with the invention, the Structure (I) polymer, a slight excess of the stoichiometric amount of multifunctional silane to form crosslinks with all the hydroxy end groups of the Structure (I) polymer, and the appropriate amount of tin oxide filler are thoroughly mixed on a three-roll mill. If a catalyst is necessary, it is then added to the mix with thorough stirring. The mix is then degassed and injected into a mold surrounding the fuser roll core to mold the material onto the core. The covered core remains in the mold for a time sufficient for some crosslinking to occur (e.g., 18 hours). The covered roll is then removed from the mold and heated to accelerate the remaining crosslinking. The other layer or layers are then coated thereover by any appropriate method.

It is currently preferred, in some embodiments of the invention, to apply the base cushion over a support which has been conversion coated and primed with metal alkoxide primer in accordance with a U.S. Patent Application filed by Allen Kass, Oct. 21, 1993, entitled "FUSING MEMBER FOR ELECTROSTATOGRAPHIC REPRODUCING APPARATUS AND METHOD FOR PREPARING FUSING MEMBER"; the specification of which is hereby incorporated by reference.

The following examples are presented to further illustrate some specific fuser roll base cushion layer materials in accordance with the invention and to compare their properties with base cushion layer materials not useful in accordance with the invention.

EXAMPLE 1

35 Vol % $SnO_2$

Sample slabs of filled condensation-crosslinked PDMS elastomer were prepared by mixing Structure (I) silanol-terminated PDMS, tetraethoxysilane (also referred to as "TEOS") crosslinking agent, and particulate filler on a three-roll mill and then stirring dibutyltin diacetate catalyst into the mix. The formulation was degassed and injected into a mold to cure for 48 hours at 25° C. and 50% relative humidity. The resultant slab was removed from the mold and further cured in an air-circulating oven for 16 hours at 205° C. The final filled condensation-crosslinked slab was 1.9 mm thick. Circular disks (12 mm diameter) were cut from the slab.

Thermal conductivity of the disks was measured in accordance with ASTM F433-77.

Six of the circular disks were stacked, one upon the other, weighed, and then placed in a test instrument called a Mechanical Energy Resolver (also referred to herein as an "MER"), commercially available from Instrumentors, Inc. Strongsville, Ohio, U.S.A. The instrument heated the stack to 218° C. and imposed a static compressive force of 8 kg on the stack. The length of the stack under the initial compressive force was then measured, as was the initial hardness (expressed in terms of "storage modulus"). The MER then imposed cyclic stress on the sample stack by sinusoidally varying the initial compressive force by 4 kg rms at a frequency of 30 Hz for 60 hours, while maintaining the 218° C. temperature. After 60 hours, the final hardness and length under the static 8 kg compressive force were measured, as was the final weight of the sample stack. The storage modulus determination was done in accordance with the method of calculation described in Fitzgerald, et al., "The Effect of Cyclic Stress on the Physical Properties of a Poly(dimethylsiloxane) Elastomer", *Polymer Engineering and Science*, vol. 32, No. 18 (September 1992), pp. 1350–1357. Results of these tests are presented in Table I below, wherein "TC" means thermal conductivity, "SM" means storage modulus, "%ΔSM" means the percent change in the storage modulus after 60 hours of cyclic stress and elevated temperature, "L" means length of the six-disk stack, "%ΔL" means the percent change in L after 60 hours of cyclic stress and elevated temperature, and "%WL" means the percent loss in weight after 60 hours of cyclic stress and elevated temperature.

In this example the formulation employed to prepare the samples comprised: 61.56 Volume percent (19.51 weight percent) silanol-terminated PDMS having a weight average molecular weight of about 32,200, obtained commercially from Huls America, Inc., U.S.A., under the trade designation, PS 342.5; 3.22 vol. % (1.02 wt %) TEOS crosslinking agent; 35.00 vol % (78.87 wt %) $SnO_2$ particles; and 0.23 vol. % (0.11 wt %) dibutyltin diacetate catalyst.

Additionally, a fuser roll in accordance with the invention was prepared. The outer surface of a rigid cylindrical aluminum core was scrubbed clean, rinsed with hot water, and dried. To this core was applied a thin layer of primer (obtained commercially from General Electric Co., U.S.A., under the trade designation S54044) using a brush and then drying in ambient air (room temperature) for one hour.

The base cushion layer formulation described above was then injected into a mold surrounding the core to mold the base cushion layer to the core. The material was left in the mold at room temperature for 18 hours. The covered roll was then removed from the mold, allowed to stand for 2 days, then heated slowly up to a temperature of 232° C. over 18 hours, and then maintained at 232° C. for another 18 hours to complete the crosslinking. The resultant base cushion layer had a thickness of about 2.5 mm. An oil-barrier layer comprising poly(vinylidene fluoride-co-hexafluoropropylene) (obtained commercially from DuPont, U.S.A., under the trademark, Viton A) was then coated to a thickness of about 25 micrometers on the base cushion layer to yield the final fuser roll.

The fuser roll was then employed in a simulated fusing system with a pressure roll arranged to press against it with a pressure of 552 kPa. The pressure roll had the "bow tie" or "hourglass" shape mentioned previously, with the radius of the pressure roll at the midpoint of its axis being 81 micrometers smaller than the radii of the roll at the ends of its axis.

While pressing against each other, the rolls were rotated such that their outer surfaces traveled at a speed of 12.7 cm/s, with the fuser roll being maintained at a temperature of 204° C. The system was operated continuously under these conditions for 150 hours.

The hardness of the fuser roll was measured before, during, and after testing on the simulated fusing system using a Digital Exacta hardness tester (Model EX200/300T from New Age Industries, Willow Grove, Pa.) having an IRHD Micro head in accordance with ASTM Standard D1415. This device gives hardness readings in the units of International Rubber Hardness Degrees (IRHD) which are analogous to Shore A units in the range of 30–90 Shore A. Crowning was determined using a Federal Systems 2000 Surfanalyzer with a Model 1200 drive unit and a transverse chisel stylus Model EPT- 01040. Thermal conductivity was determined using a Holometrix TCA at 175° C. Results are reported in Table III.

After completion of this test, it was found that the fuser roll remained regularly cylindrical; i.e., the base cushion layer did not creep (permanently deform) to conform to the shape of the pressure roll.

COMPARATIVE EXAMPLE A

EC4952

Sample circular disks were prepared and tested as described in Example 1, except that the samples contained 32–37 vol % particulate aluminum oxide filler and 2–6 vol % particulate iron oxide filler, instead of the 35 vol. % $SnO_2$ particulate filler employed in Example 1. The material was obtained commercially from the Emerson Cummings Co., U.S.A., under the trade name, EC4952. Results of the MER tests on these samples are presented in Table I below.

The results show that EC4952 was much more unstable under conditions of elevated temperature and cyclic stress than that of Example 1, exhibiting much more weight loss, change in storage modulus, and creep (change in length).

Additionally, a fuser roll was fashioned as described in Example 1, except, again, the base cushion layer material was EC 4952, instead of the formulation described in Example 1. In this case, after completion of the test, it was found that the base cushion layer exhibited significant creep, i.e., the radius of the region of the fuser roll about the midpoint of its axis increased by 76 micrometers. In other words, the base cushion layer permanently deformed to conform to the shape of the pressure roll, in contrast to the base cushion layer of the inventive fuser roll of Example 1, which did not permanently deform.

EXAMPLES 2–3

20 and 25 Vol % $SnO_2$

Sample circular disks of base cushion material in accordance with the invention were prepared and tested as described in Example 1. The formulation was similar to that of Example 1, except that instead of 35 vol. % $SnO_2$, the samples of Examples 2 and 3, contained 20 and 25 vol. % $SnO_2$, respectively.

The results of these tests are presented in Table I below, and show that all of these samples exhibited good stability under conditions of elevated temperature and cyclic stress.

COMPARATIVE EXAMPLE B

ZnO plus MgO

Formulations were prepared as in Example 1, except that instead of 35 vol. % $SnO_2$, there was employed 35 vol. % filler comprising ZnO and MgO in various proportions. None of these formulations would undergo condensation-crosslinking. Apparently, the presence of MgO prevented the crosslinking reaction from occurring.

COMPARATIVE EXAMPLES C AND D

33vol. % and 51 vol. % Graphite

Sample circular disks were prepared and tested as in Example 1, except that, instead of 35 vol. $SnO_2$, the samples of Comparative Example C contained 33 vol. % graphite fibers, and the samples of Comparative Example D contained 51 vol. % graphite fibers.

Results of the tests are presented in Table I, below, and show that the samples of both these comparative examples were unstable under conditions of elevated temperature and cyclic stress (fairly high weight loss and large change in storage modulus).

COMPARATIVE EXAMPLES E, F, G, and H

35 vol. % $Al_2O_3$, $TiO_2$, $WO_3$, and CaO

Sample circular disks were prepared and tested as described in Example 1, except that instead of 35 vol. % $SnO_2$, the samples of Comparative Examples E, F, G, and H contained 35 vol. % $Al_2O_3$, $TiO_2$, $WO_3$ (tungsten oxide), and CaO, respectively.

Results of the tests are presented in Table I, below, and show that the samples of all of these comparative examples were unstable under conditions of elevated temperature and cyclic stress (high weight loss and very high changes in storage modulus and/or length).

COMPARATIVE EXAMPLES I, J, and K

25 vol. %, 30 vol. %, and 35 vol. % Silicon Carbide

Sample circular disks were prepared and tested as described in Example 1, except that instead of $SnO_2$, the samples of Comparative Examples I, J, and K contained 25, 30 and 35 volume percent silicon carbide.

Results of the tests are presented in Table II, below, and show that the samples of these comparative examples were unstable under conditions of elevated temperature and cyclic stress (fairly high weight loss and large change in length).

COMPARATIVE EXAMPLES L, M, and N

Hardness, Crowning, and Thermal Conductivity

Fuser rolls were prepared and evaluated as in Example 1; with the exception that in Comparative Example L, 30 Vol. % mineral silica and 2.5 Vol. % fumed silica were used in place of $SnO_2$; in Comparative Example M, 25 Vol. % zinc oxide was used in place of $SnO_2$; and in Comparative Example N, EC4952 was used as base cushion layer. Results are reported in Table III.

Table III provides a comparison of Example 1 with Comparative Examples L, M, and N. The hardness of Example 1 is close to that of Comparative Examples L, M, and N, while the thermal conductivity is higher and the crowning and hardening rates are both low.

TABLE I

| Example | TC (W/mK) | Initial SM (MPa) | Final SM (MPa) | ΔSM (%) | Initial L (mm) | Final L (mm) | ΔL (%) | WL (%) |
|---|---|---|---|---|---|---|---|---|
| 1 | 0.890 | 5.309 | 6.047 | 14 | 9.231 | 8.861 | 4 | 0.25 |
| 2 | 0.386 | 1.289 | 1.587 | 23 | 7.920 | 7.081 | 11 | 0.95 |
| 3 | 0.474 | 1.674 | 1.921 | 15 | 7.998 | 7.254 | 9 | 0.67 |
| Comp. A | 0.675 | 6.711 | 10.601 | 58 | 11.346 | 4.337 | 62 | 7.81 |
| Comp. B | — | — | — | — | — | — | — | — |
| Comp. C | 0.445 | 4.129 | 6.120 | 48 | 9.506 | 9.206 | 3.2 | 1.34 |
| Comp. D | — | 15.841 | 42.610 | 169 | 10.795 | 10.750 | 0.4 | 2.18 |
| Comp. E | 0.649 | 3.738 | 0.943 | 75 | 8.811 | 2.900 | 67 | 7.39 |
| Comp. F | 0.521 | 4.022 | 8.416 | 109 | 9.652 | 7.699 | 20 | 2.58 |
| Comp. G | 0.441 | 4.716 | 16.138 | 242 | 9.491 | 7.329 | 23 | 4.26 |
| Comp. H | 0.495 | 15.888 | 59.553 | 275 | 12.898 | 11.983 | 7 | 5.34 |

The invention has been described in detail with particular reference to certain preferred embodiments thereof, but it should be appreciated that variations and modifications can be effected within the spirit and scope of the invention.

What is claimed is:

1. A fuser roll useful for heat-fixing an electrographic toner to a substrate, wherein the roll comprises a core having thereon a base cushion layer comprising a condensation-crosslinked poly(dimethylsiloxane) elastomer, said poly(dimethylsiloxane) having a weight average molecular weight prior to crosslinking of from 7,000 to 70,000, said base cushion layer base cushion layer having tin oxide particles dispersed therein in a concentration of from 20 to 40 percent of the total volume of the base cushion layer.

2. The fuser roll of claim 1, wherein the concentration of tin oxide particles is from 30 to 40 percent of the total volume of the base cushion layer.

3. The fuser roll of claim 1, wherein the condensation-crosslinked poly(dimethylsiloxane) elastomer has been formed by condensation reaction of silanol-terminated poly(dimethylsiloxane) polymeric units with multifunctional silanes, each of such silanes comprising a silicon atom bonded to at least three groups that are functional to condense with hydroxy end groups of the silanol-terminated poly(dimethylsiloxane) polymeric units to thereby crosslink the polymeric units through the silicon atom.

4. The fuser roll of claim 3 where said multifunctional silanes, each of such silanes comprising a silicon atom attached to at least three groups that are functional, wherein each said groups independently comprises an acyloxy, alkenoxy, alkoxy, dialkylamino, or alkyliminoxy group.

5. The fuser roll of claim 3 where said multifunctional silanes, each of such silanes comprising a silicon atom attached to at least three groups that are functional, wherein each said groups comprise alkoxy groups, and wherein the condensation reaction has been carried out with the aid of a catalyst for said reaction.

6. The fuser roll of claim 1, wherein the roll has an oil-barrier layer over the base cushion layer.

7. The fuser roll of claim 6, further comprising a second layer that overlies the oil-barrier layer.

8. The fuser roll of claim 7, wherein the second layer that overlies the oil-barrier layer comprises vinyl-addition-crosslinked poly(dimethylsiloxane) containing silica and titania fillers, and the oil-barrier layer comprises poly(vinylidene fluoride-co-hexafluoropropylene).

9. A fuser member, useful for heat-fixing an electrographic toner to a substrate, comprising a core having thereon a layer comprising a condensation-crosslinked poly(dimethylsiloxane) elastomer, said poly(dimethylsiloxane) having a weight average molecular weight prior to crosslinking of from 7,000 to 70,000, said layer having dispersed therein particles of tin oxide having a concentration of from 20 to 40 percent of the total volume of said layer, said layer being more resistant to changes in size and storage modulus, under conditions of cyclic stress and elevated temperature, than a fusing member differing only as having said tin oxide particles replaced by aluminum oxide particles having a concentration of from 32 to 37 percent of the total volume of said layer and iron oxide particles having a concentration of from 2 to 6 percent of the total volume of said layer.

10. The fuser member of claim 9 wherein said conditions of cyclic stress and elevated temperature are further characterized as a compressive force, having a static compressive value of 8 kg, sinusoidally varied at a frequency of 30 Hz to provide an rms force of 4 kg, for a time period of 60 hours and at a temperature of about 218° C.

11. The fuser member of claim 9, wherein the concentration of said tin oxide particles is from 30 to 40 percent of the total volume of said layer.

12. The fuser member of claim 9, wherein said condensation-crosslinked poly(dimethylsiloxane) elastomer has been formed by condensation reaction of silanol-terminated poly(dimethylsiloxane) polymeric units with multifunctional silanes, each of such silanes comprising a silicon atom bonded to at least three groups that are functional to condense with hydroxy end groups of the silanol-terminated poly(dimethylsiloxane) polymeric units to thereby crosslink the polymeric units through the silicon atom.

13. The fuser member of claim 12 wherein said multifunctional silanes, each of such silanes comprising a silicon atom attached to at least three groups that are functional, wherein each said groups independently comprises an acyloxy, alkenoxy, alkoxy, dialkylamino, or alkyliminoxy group.

14. The fuser member of claim 13 wherein said groups each comprise alkoxy groups.

15. The fuser member of claim 9, further comprising an oil-barrier layer over said layer.

16. The fuser member of claim 15, wherein said oil-barrier layer comprises poly(vinylidene fluoride-co-hexafluoropropylene) and said fuser member further comprises a second layer overlying said oil-barrier layer, said second layer comprises vinyl-addition-crosslinked poly(dimethylsiloxane) containing silica and titania fillers.

17. A fuser member, useful for heat-fixing an electrographic toner to a substrate, comprising a core having thereon a layer comprising a condensation-crosslinked poly(dimethylsiloxane) elastomer, said poly(dimethylsiloxane) having a weight average molecular weight prior to crosslinking of from 7,000 to 70,000, said layer having dispersed therein particles selected from the group consisting of tin oxide and silicon carbide, said particles having a concentration of from 20 to 40 percent of the total volume of said layer, said layer being more resistant to a change in storage modulus, under conditions of cyclic stress and elevated temperature, than a fusing member differing only as having said tin oxide particles replaced by aluminum oxide particles having a concentration of from 32 to 37 percent of the total volume of said layer and iron oxide particles having a concentration of from 2 to 6 percent of the total volume of said layer.

18. The fusing member of claim 17 wherein said conditions of cyclic stress and elevated temperature are further characterized as a compressive force, having a static compressive value of 8 kg, sinusoidally varied at a frequency of 30 Hz to provide an rms force of 4 kg, for a time period of 60 hours and at a temperature of about 218° C.

19. The fuser member of claim 18, wherein the concentration of said particles is from 30 to 40 percent of the total volume of said layer.

* * * * *